United States Patent
Lyons

(10) Patent No.: US 6,858,159 B2
(45) Date of Patent: Feb. 22, 2005

(54) TITANIUM-DOPED HAFNIUM OXIDE SCINTILLATOR AND METHOD OF MAKING THE SAME

(75) Inventor: Robert Joseph Lyons, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 326 days.

(21) Appl. No.: 10/063,182

(22) Filed: Mar. 28, 2002

(65) Prior Publication Data

US 2003/0183806 A1 Oct. 2, 2003

(51) Int. Cl.[7] ............................................. C09K 11/67
(52) U.S. Cl. ................ 252/301.4 F; 378/19; 378/98.8; 250/363.02
(58) Field of Search ..................... 252/301.4 F, 301.17; 378/19, 98.8; 250/363.02

(56) References Cited

U.S. PATENT DOCUMENTS

| | | | |
|---|---|---|---|
| 4,006,097 A | 2/1977 | Kelsey, Jr. | |
| 4,421,671 A | 12/1983 | Cusano et al. | |
| 4,473,513 A | 9/1984 | Cusano et al. | |
| 4,525,628 A | 6/1985 | DiBianca et al. | |
| 4,783,596 A | 11/1988 | Riedner et al. | |
| 4,980,559 A | 12/1990 | Bryan et al. | |
| 4,988,880 A | 1/1991 | Bryan et al. | |
| 4,990,282 A | * 2/1991 | Bryan et al. | 252/301.4 F |
| 4,996,003 A | * 2/1991 | Bryan et al. | 252/301.4 F |
| 5,008,034 A | * 4/1991 | Bryan et al. | 252/301.4 F |
| 5,017,791 A | 5/1991 | Bryan et al. | |
| 5,095,218 A | * 3/1992 | Bryan et al. | 250/483.1 |

OTHER PUBLICATIONS

L.H. Brixner, "Structural and Luminescent Properties of the Ln2Hf2O7—Type Rare Earth Hafnates," Mat. Res. Bull., vol. 19, 143–149 (1984).

* cited by examiner

Primary Examiner—C. Melissa Koslow
(74) Attorney, Agent, or Firm—Toan P. Vo; Patrick K. Patnode

(57) ABSTRACT

Hafnium oxide $HfO_2$ scintillator compositions are doped with titanium oxide and at least an oxide of a metal selected from the group consisting of Be, Mg, and Li. The scintillator compositions can include sintering aid material such as scandium and/or tin and a rare earth metal and/or boron for improved transparency. The scintillators are characterized by high light output, reduced afterglow, short decay time, and high X-ray stopping power. The scintillators can be used as detector elements in X-ray CT systems.

46 Claims, 3 Drawing Sheets

TITANIUM-DOPED HAFNIUM OXIDE SCINTILLATOR AND METHOD OF MAKING THE SAME

BACKGROUND OF INVENTION

The present invention relates to titanium-doped hafnium oxide phosphors and scintillators useful for the detection of high-energy radiation. In particular, the present invention relates to a titanium-doped hafnium oxide X-ray phosphor or scintillator comprising beryllium, magnesium, and/or lithium having improved light output. The present invention also relates to X-ray detectors and detection systems incorporating an X-ray phosphor or scintillator comprising polycrystalline titanium-doped hafnium oxide.

The terms "phosphor" and "scintillator" are used herein in an interchangeable way to mean a solid-state luminescent material that emits visible light in response to stimulation by high-energy radiation such as X, β, or γ radiation. The term "high-energy radiation" means electromagnetic radiation having energy higher than that of ultraviolet radiation. Solid-state scintillator materials are in common use as component of radiation detectors in apparatuses such as counters, image intensifiers, and computed tomography ("CT") scanners. Scintillator materials especially find widespread use in X-ray detectors. One embodiment of the present generation of solid-state ceramic scintillators comprises oxide mixtures in which a rare-earth oxide is present as an activator, along with various combined matrix elements, which are also usually rare-earth oxides. Other metallic compounds may also be present as additives for specific purposes. These scintillators have been characterized by the advantageous properties of high efficiency, moderate decay time, low afterglow and little or no radiation damage upon exposure to high X-ray doses.

One important property of CT systems is scan time which is the time required for a CT system to scan and acquire an image of a slice of the object under observation. Scan times of CT systems are related to primary decay time (sometimes simply "decay time" hereinafter) of the scintillator roughly by a factor of 1000. Thus, a scintillator having a decay time of 1 millisecond will typically produce a scan time of about 1 second. The scanning units containing the present generation of scintillators have scan times on the order of 1 second, and in any event no lower than about 0.7 second.

In future generations of CT scanners and the like, shorter scan times are desired. This is true because decreasing scan time makes possible an increase in patient volume covered in a given time or an increase in the number of scans within a single breath hold. Also, it reduces image blurring due to motion of internal organs and of non-cooperating patients, including pediatric patients.

Shorter scan times are achievable if the primary decay time of the phosphor or scintillator is shortened. In general, scan time in seconds is associated with a primary decay time of an equal number of milliseconds. As the speed of data processing in CT scanners increases due to advances in electronic circuit designs, it is desired to have faster scintillators, i.e., shorter time between receipts of stimulating radiation pulses so to fully take advantage of the capability of the scanner. Therefore, any measurable percentage decrease in decay time from that exhibited by the present generation of ceramic scintillators would be a distinct improvement, particularly when accompanied by the other advantageous properties described above.

Among the preferred scintillator compositions in the present generation of CT scanners are the ceramic scintillators employing at least one of the oxides of lutetium, yttrium, and gadolinium as matrix materials. These are described in detail, for example, in U.S. Pat. Nos. 4,421,671; 4,473,513; 4,525,628; and 4,783,596. They typically comprise a major proportion of yttria ($Y_2O_3$), up to about 50 mole percent gadolinia ($Gd_2O_3$) and a minor activating proportion (typically about 0.02–12, preferably about 1–6 and most preferably about 3 mole percent) of a rare earth activator oxide. Suitable activator oxides, as described in the aforementioned patents, include the oxides of europium, neodymium, ytterbium, dysprosium, terbium, and praseodymium. Europium-activated scintillators are often preferred in commercial X-ray detectors by reason of their high luminescent efficiency, low afterglow level, and other favorable characteristics. Europium is typically present therein in amounts up to 30 and most often up to about 12, preferably in the range of 1–6 and most preferably about 3 mole percent. Decay times of such scintillators are on the order of 0.9–1.0 millisecond. However, such decay times still leave much to be desired.

The search thus continues for ceramic scintillator compositions having shorter decay times in combination with the aforementioned other advantageous properties.

SUMMARY OF INVENTION

The present invention provides improved scintillator compositions comprising a titanium-doped hafnium oxide. The scintillator compositions are useful in the detection of high-energy radiation, such as X, β, or γ radiation. Particularly, the scintillators of the present invention have improved light output, reduced afterglow, short decay time, and high X-ray stopping power in X-ray detection applications.

According to one aspect of the present invention, the scintillator compositions comprise hafnium oxide ($HfO_2$) doped with titanium oxide ($TiO_2$) in an amount from about 0.05 to about 4 mole percent of the total composition, and at least an oxide of at least a metal selected from the group consisting of Be, Mg, and Li in an amount from about 0.05 to about 4 mole percent of the total composition.

According to another aspect of the present invention, a method for producing a titanium-doped hafnium oxide scintillator comprising at least a metal selected from the group consisting of Be, Mg, and Li, the scintillator being useful for a detection of X, β, or γ radiation comprises the steps of: (1) providing amounts of compounds of titanium, hafnium, and at least a metal selected from the group consisting of Be, Mg, and Li; the amounts of compounds being selected such that the final composition of the scintillator is achieved; (2) mixing together the compounds to form a mixture; and (3) firing the mixture at a temperature and for a time sufficient to convert the mixture to a titanium-doped hafnium oxide scintillator containing at least a metal selected from the group consisting of Be, Mg, and Li.

In still another aspect of the present invention, an X-ray detector is provided and comprises a scintillator comprising hafnium oxide doped with titanium oxide in an amount from about 0.05 to about 4 mole percent of the total composition, and at least an oxide of at least a metal selected from the group consisting of Be, Mg, and Li in an amount from about 0.05 to about 4 mole percent of the total composition.

In still another aspect of the present invention, the X-ray detector comprises a polycrystalline hafnium oxide doped with titanium oxide and at least an oxide of at least a metal selected from the group consisting of Be, Mg, and Li.

In still another aspect of the present invention, such an X-ray detector is incorporated in a CT system.

Other features and advantages of the present invention will be apparent from a perusal of the following detailed description of the invention and the accompanying drawings in which the same numerals refer to like elements.

DETAILED DESCRIPTION

Figure 1:
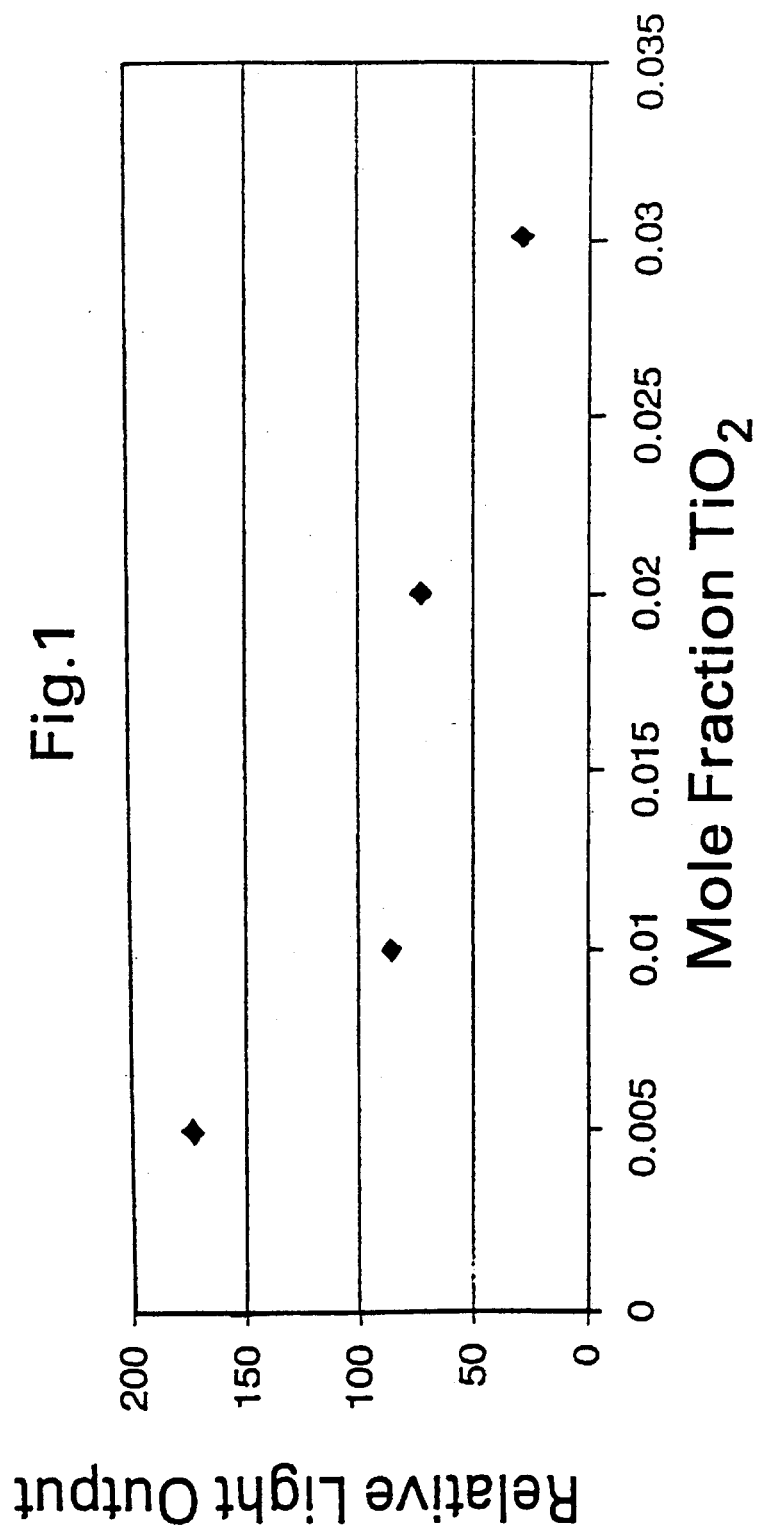
FIG. 1 is a graph of the relative light output of titanium-doped hafnium oxide scintillators of the present invention having different levels of titanium.
Figure 2:
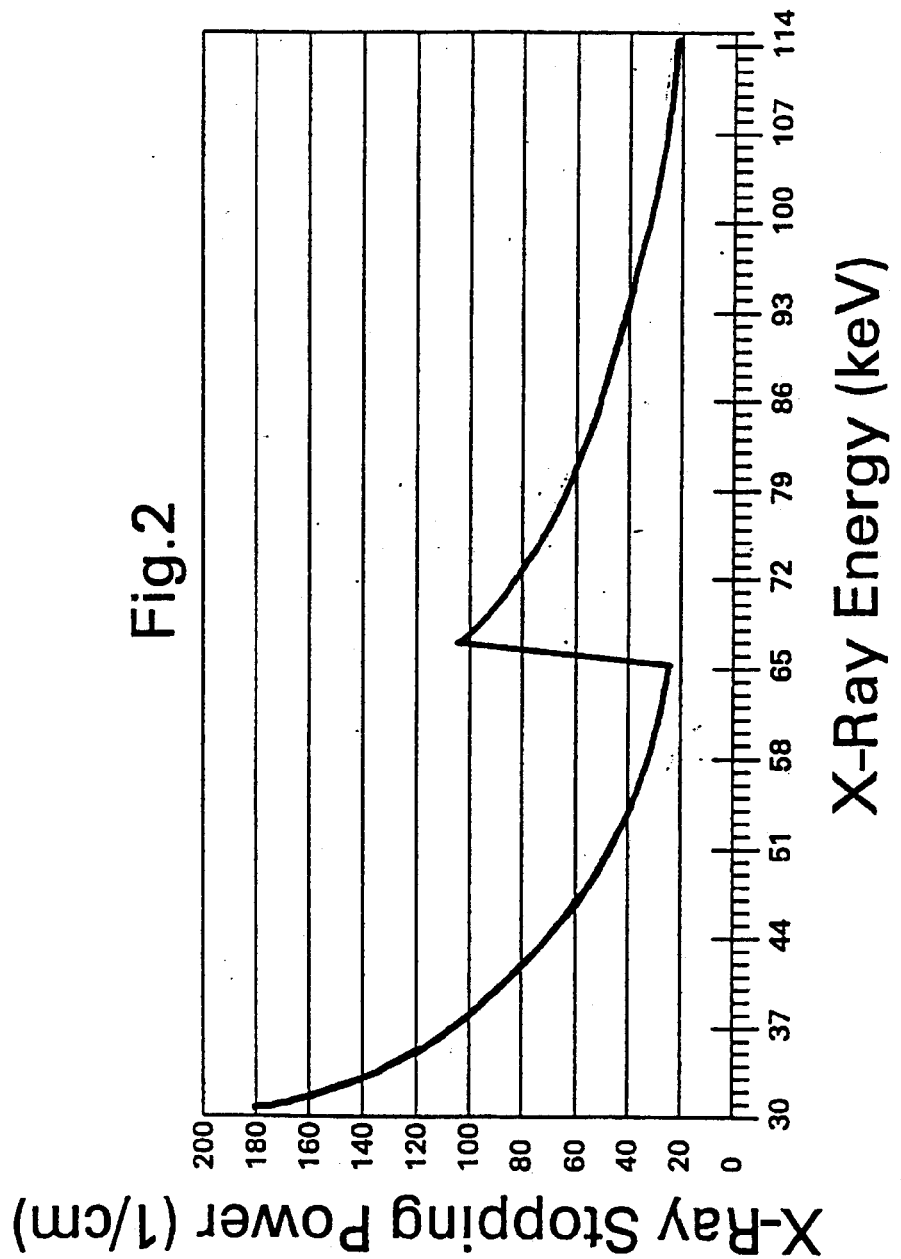
FIG. 2 shows the X-ray stopping power of a scintillator of the present invention with respect to different X-ray energies.
Figure 3:
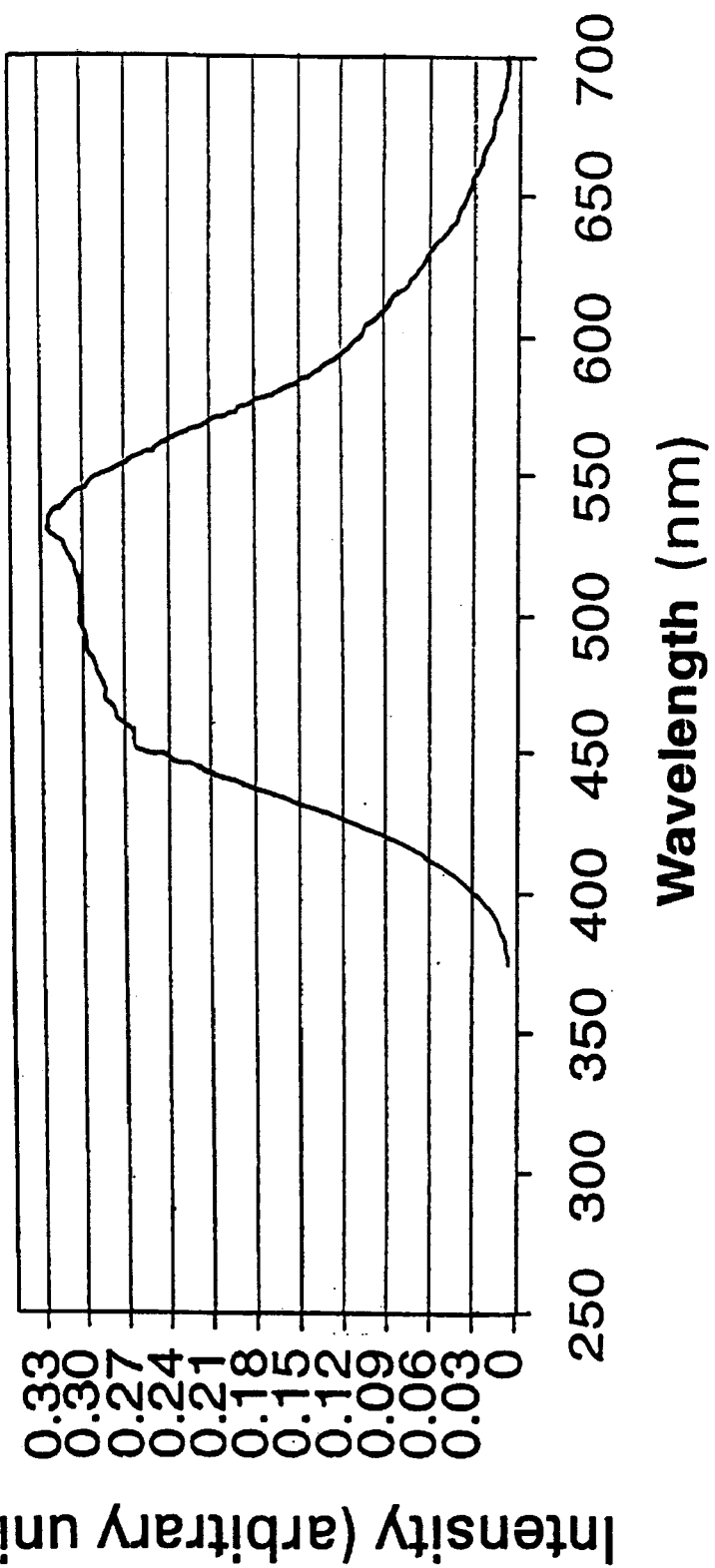
FIG. 3 is an emission spectrum of a hafnium oxide scintillator doped with 0.5 mole percent titanium oxide and 1 mole percent magnesium oxide.

The present invention provides titanium-doped hafnium oxide scintillator that comprises at least a metal selected from the group consisting of Be, Mg, and Li and substantially has a monoclinic phase structure. All metals disclosed herein are present in the scintillator compositions in association with oxygen, rather than in elemental form. In one aspect of the present invention, the scintillators are responsive to X-ray excitation and have improved light output, reduced afterglow, short decay time, and high X-ray stopping power.

As used herein, the term "light output" is the quantity of visible light emitted by the scintillator after being excited by a pulse of X-ray having an average intensity of about 33 keV, a peak intensity of 60 keV, and having a duration of 500 milliseconds. For ease of comparison, the light output presented in this disclosure is a relative quantity compared to the light output of an established standard europium-activated yttrium gadolinium oxide scintillator. The term "afterglow" is the light intensity emitted by the scintillator at 100 milliseconds after the X-ray excitation ceases, reported as a percentage of the light emitted while the scintillator is excited by the X radiation. The term "decay time," "primary decay," or "primary speed" is the time required for the intensity of the light emitted decreases to about 36.8% (or 1/e) of the light intensity at the time after the X-ray excitation ceases. The term "stopping power" refers to the ability of a material to absorb X-radiation, commonly called the attenuation or absorption. A material having a high stopping power allows little or no X-radiation to pass through. The stopping power is directly related to the density of the scintillator and the elements contained therein. Thus, it is advantageous to produce scintillators having high density. The term "radiation damage" refers to the characteristic of a luminescent material in which the quantity of light emitted by the luminescent material in response to a given intensity of stimulating radiation changes after the material has been exposed to a high radiation dose.

Higher light output is advantageous because a lower amount of X-ray excitation energy is required. Thus, the patient is exposed to a lower dose of X-ray energy. Reduced afterglow is advantageous because the image is sharper and free from image artifacts, sometimes referred to as "ghost images." Shorter decay time is preferred because the scan time can be reduced, resulting in more efficient use of the CT system. Higher stopping power is preferred because only a smaller quantity of scintillator is needed. Thus, thinner detectors are possible, resulting in lower cost of manufacture. A thinner detector also has an advantage of reducing the absorption of emitted light. Low radiation damage is advantageous because the sensitivity of the scintillator to exciting radiation remains substantially constant over a long-term use.

The present invention provides a titanium-doped hafnium oxide scintillator comprising an alkaline earth metal that is efficiently excitable by X-radiation and efficiently emits light in the visible range having a broad spectrum from blue to red (from about 400 nm to about 600 nm). The scintillator has an emission peak in the blue-green range (from about 450 nm to about 550 nm), which includes the range of maximum sensitivity of X-ray image intensifiers and photodetectors. The scintillator of the present invention is a titanium-doped hafnium oxide containing at least a metal selected from the group consisting of Be, Mg, and Li. The scintillator comprises hafnium oxide doped with titanium oxide and at least an oxide of at least a metal selected from the group consisting of Be, Mg, and Li. Titanium oxide is present in an amount from about 0.05 to about 4 mole percent of the total composition, preferably in the range from about 0.05 to about 2 mole percent, more preferably from about 0.1 to about 1.5 mole percent, and most preferably from about 0.125 to about 0.75. The oxide of at least a metal selected from the group consisting of Be, Mg, and Li is present in an amount from about 0.05 to 4 mole percent of the total composition, preferably in the range from about 0.5 to about 3 mole percent, and more preferably from about 1 to about 2 mole percent. The preferred composition contains Mg. The scintillator has a substantial monoclinic phase crystal structure.

In one preferred embodiment, the scintillator comprises 0.5 mole percent of titanium oxide and 1.5 mole percent of magnesium oxide.

In one embodiment of the present invention, the scintillator further comprises scandium oxide ($Sc_2O_3$) and/or tin oxide $SnO_2$. Scandium and/or tin compounds are introduced into the composition of the scintillator as sintering aids during the manufacture of the scintillator. Each of scandium oxide and tin oxide can be present in an amount up to about 5 mole percent, preferably in the range from about 1 to about 3 mole percent, of the final scintillator composition.

A scintillator composition of the present invention may be prepared by a dry or wet synthesis method. A scintillator of the present invention useful for a detection of high-energy radiation such as X, β, or γ radiation is produced by a dry synthesis method comprising the steps of: (1) providing amounts of compounds of titanium, hafnium, and at least a metal that is selected from the group consisting of Be, Mg, and Li; the amounts of these compounds being selected such that the final composition of the scintillator is achieved; (2) mixing together the compounds to form a mixture; and (3) converting the compounds in the mixture substantially to water-insoluble oxygen-containing compounds; and (4) firing the mixture at a temperature and for a time sufficient to convert the mixture to a titanium-doped hafnium oxide scintillator comprising at least a metal selected from the group consisting of Be, Mg, and Li.

Compounds of titanium, hafnium, and at least a metal selected from the group consisting of Be, Mg, and Li that may be used in the preparation of the scintillators of the present invention are the inorganic compounds such as oxides, carbonates, nitrates, halides, oxyhalides, oxynitrates, and sulfates. Other suitable compounds are the oxygen-containing organic compounds, such as the metal salts of mono- and di-carboxylic acids containing 1 to 6 carbon atoms, esters of di-carboxylic acids containing 1 to 6 carbon atoms, metal salts of aromatic acids having 1 or 2 aromatic rings, metal acetylacetonates, metal alkoxides containing 1 to 6 carbon atoms, and metal phenoxides.

When some of the compounds used to make the mixture are not oxides, the method further comprises the step of converting the compounds in the mixture substantially to oxygen-containing compounds. Such a conversion can be carried out by heating the mixture in an oxygen-containing atmosphere, such as oxygen, air, $CO_2$, or a mixture comprising an oxygen-containing gas and an inert gas selected from the group consisting of nitrogen, helium, neon, argon, krypton, and xenon.

In one aspect of the present invention, at least one compound of scandium is added into the mixture prior to firing the mixture. Further, at least one compound of tin may be added into the mixture in addition to or in place of the scandium compound. The Applicants have discovered that scandium oxide and/or tin oxide added into the composition up to about 5 mole percent can act as effective sintering aid in improving the transparency of the final polycrystalline titanium-doped hafnium oxide scintillators.

In another aspect of the present invention, an amount of a compound selected from the group consisting of halides and carbonates of titanium, hafnium, alkali, and at least a metal selected from the group consisting of Be, Mg, and Li is added as a fluxing agent into the mixture before or during the step of mixing. A quantity of a halide or a carbonate compound of less than about 20, preferably less than about 10 percent by weight of the total weight of the mixture is adequate for fluxing purposes. A preferred halide is fluoride. When an alkali halide or carbonate is used as a fluxing agent, the scintillator may be preferably washed to remove residual soluble alkali metal compounds and dried before it is used.

The metal compounds may be mixed together by any mechanical method including, but not limited to, stirring or blending in a high-speed blender or a ribbon blender. The metal compounds may be combined and pulverized together in a bowl mill, a hammer mill, or a jet mill. The mixing may be carried out by wet milling especially when the mixture of the metal compounds is to be made into a solution for subsequent precipitation. If the mixture is wet, it may be dried first before being fired under an oxygen-containing atmosphere at a firing temperature from about 900° C. to about 1650° C., preferably from about 1000° C. to about 1500° C., more preferably from about 1300° C. to about 1400° C. for a time sufficient to convert all of the mixture to the final scintillator composition having a monoclinic phase crystal structure. The drying may be conducted at atmospheric or subatmospheric pressure in an oxygen-containing gas; such as air, oxygen, or mixtures thereof and inert gases, such as nitrogen, helium, neon, argon, krypton, or xenon; at a temperature sufficient to remove a portion of or substantially all solvent used in the wet milling process. When the starting compounds are not oxides, it may be desirable to convert them to the corresponding oxides by heating the mixture of these compounds to a temperature above the highest decomposition temperature of these compounds. Typically, such a conversion is substantially complete at a temperature between about 400° C. and about 900° C. The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The fired material may be pulverized afterward to provide a scintillator in a powder form for further processing into X-ray detector elements. The powder may be cast with the addition of a binder into a green element, then further sintered at temperature in the range of from about 900° C. to less than about 1650° C., preferably from about 1300° C. to about 1400° C. to increase the density of the element.

In one preferred embodiment of the present invention, the titanium-doped hafnium oxide scintillator is produced as a polycrystalline formed structure or body. Amounts of compounds of hafnium, titanium, and at least one metal selected from the group consisting of Be, Mg, and Li chosen to produce the final scintillator composition are milled in a liquid slurry with zirconia grinding media for a time in the range from about 1 minute to about 48 hours. Suitable solvents are alcohols, such as methanol or ethanol, or other solvents that have normal boiling points preferably less than about 100° C. The slurry is then filtered, and the milled powder is dried. The dried milled powder is compacted into a shaped or formed structure or body appropriate for use in an X-ray detector, such as a wafer shape, at a pressure of about 35 MPa. When the starting compounds are not oxides, it may be desirable to convert them to the corresponding oxides by heating the formed structure or body to a temperature above the highest decomposition temperature of these compounds. Typically, such a conversion is substantially complete at a temperature between about 400° C. and about 900° C. The formed structure or body is isostatically pressed at pressure of about 200–210 MPa. The isostatically pressed formed structure or body is then sintered in an oxygen-containing atmosphere at a temperature in the range from about 900° C. to less than about 1650° C., preferably from about 1300° C. to about 1400° C. Improved brightness and transparency can be obtained by adding from about 1 to about 5 mole percent, preferably from about 1 to about 3 mole percent, scandium oxide and/or tin oxide into the starting mixture.

The Applicants also have discovered that the transparency with respect to emitted visible light of the final formed scintillator structure can be improved further by providing small amounts up to about 500 parts per million ("ppm") of at least a rare earth metal and/or boron in the composition. Suitable rare earth metals are Lu, Eu, and Nd. Compounds of a rare earth metal and boron may be added into the starting mixture of compounds before grinding and mixing. Alternatively, a solution of a rare earth metal salt and a boron compound can be imbibed into the isostatically pressed formed structure or body, such as that disclosed above, and the formed structure or body then is fired as disclosed. A preferred rare earth metal salt is lutetium nitrate, and a preferred boron compound is boric acid.

One or more of the starting materials for the aforementioned scintillator synthesis may be oxygen-containing compounds other than oxides that are soluble in an aqueous solution, such as nitrates, sulfates, acetates, citrates, chlorates, perchlorates, oxyhalides, or organic compounds disclosed above. For example, amounts of compounds of titanium, hafnium, and at least a metal selected from the group consisting of Be, Mg, and Li are blended and dissolved in an acid, such as nitric acid solution. The strength of the acid solution is chosen to rapidly dissolve the oxygen-containing compounds and the choice is within the skill of a person skilled in the art. Ammonium hydroxide is then added in increments to the acidic solution containing these metals while stirring to precipitate a mixture of hydroxides of Ti, Hf, and said at least a metal. Other ammonium compounds, such as ammonium carbonate or ammonium oxalate, can also be used for the precipitation of oxygen-containing compounds of Ti, Hf, and said at least an alkaline earth metal. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. The precipitate is filtered, washed with deionized water, and dried. The dried precipitate is milled or otherwise pulverized and thoroughly blended and then calcined in air at between about 400° C. and about 900° C. for a sufficient time to ensure a substantially complete dehydration of the starting material and decomposition of any organic materials used. The calcination may be carried out at a constant temperature. Alternatively, the calcination temperature may be ramped from ambient to and held at the final temperature for the duration of the calcination. The calcined material is similarly fired at a temperature in the range from about 900° C. to about 1650° C. for a sufficient time under an oxygen-containing atmosphere, such as air or a mixture of air and an inert gas, to covert all of the calcined material to the desired scintillator composition.

Scintillators of the present invention were made according to the dry process disclosed above showed advantageous properties in light output, afterglow, and speed, as shown in Table 1. The light output, as shown in Table 1, is a relative quantity compared to an established standard europium-doped yttrium gadolinium oxide scintillator (assigned a relative value of 1).

TABLE 1

| Hafnium Oxide $HfO_2$ Doped With | Relative Light Output | Afterglow % | Speed (micro-seconds) | Stopping Power (1/cm at 70 keV) |
|---|---|---|---|---|
| 2 mole percent $TiO_2$ | 0.23 | 0.17 | <10 | No data |
| 2 mole percent $TiO_2$ and 20 mole percent $MgO_2$ | 0.64 | 2.97 | <10 | No data |
| 2 mole percent $TiO_2$ and 2 mole percent $MgO_2$ | 0.94 | 1.33 | <10 | No data |
| 2 mole percent $TiO_2$ and 2 mole percent $MgO_2$ | 0.74 | 0.41 | <10 | No data |
| 1 mole percent $TiO_2$ and 1 mole percent $MgO_2$ | 0.85 | 1.66 | <10 | No data |
| 3 mole percent $TiO_2$ and 1 mole percent $MgO_2$ | 0.31 | 0.09 | <10 | No data |
| 0.5 mole percent $TiO_2$ and 1.5 mole percent $MgO_2$ | 1.74 | 3.69 | <10 | 100 |
| 2 mole percent $TiO_2$, 2 mole percent $MgO_2$, 0.01 mole percent $Eu_2O_2$, and 0.01 mole percent $Nd_2O_3$ | 0.46 | 0.15 | No data | No data |

Table 1 shows that adding an alkaline earth metal such as Mg increases light output of titanium-doped hafnium oxide scintillators and can provide light output higher than that of the standard europium-doped yttrium gadolinium oxide scintillator and decrease the decay time to much shorter than the acceptable level of 500 microseconds.

The wet process of preparation comprises the steps of (1) preparing a first solution having appropriate amounts of compounds of titanium, hafnium, and at least one metal selected from the group consisting of Be, Mg, and Li; (2) providing a second solution selected from the group consisting of ammonium hydroxide, hydroxides of at least one of titanium, hafnium, and said at least one alkaline earth metal; alkyl esters of a dicarboxylic acid selected from the group consisting of oxalic acid, malonic acid, succinic acid, and glutaric acid; and amines selected from the group consisting of methanolamine, ethanolamine, propanolamine, dimethanolamine, diethanolamine, dipropanolamine, trimethanolamine, triethanolamine, and tripropanolamine; and mixture thereof; (3) mixing the first solution into the second solution to precipitate a mixture of oxygen-containing compounds of titanium, hafnium, and said at least one alkaline earth metal; (4) separating the precipitate mixture from the supernatant liquid; (5) drying the precipitate mixture; (5) optionally calcining in an oxygen-containing atmosphere; and (6) firing the calcined material at a temperature for a time sufficient to convert the calcined material to a titanium-doped hafnium oxide scintillator containing said at least one metal selected from the group consisting of Be, Mg, and Li. One or more compounds of halides or carbonates of titanium, hafnium, and said at least one metal selected from the group consisting of Be, Mg, and Li may be added in a minor amount into the first solution, such as up to about 2 mole percent, to act as a fluxing compound during the firing of the mixture. The first solution may be added slowly, such as drop-wise, into the second solution while the second solution is stirred. Calcination may be carried out at a temperature in the range from about 400° C. to about 900° C. under an atmosphere of oxygen-containing gas, such as air, oxygen, or a mixture of oxygen and an inert gas selected from the group consisting of nitrogen, helium, neon, argon, krypton, and xenon. The firing may be carried out under a condition as stated above. The calcination and firing atmosphere may be the same or may have different compositions. The calcination and firing steps may be conducted in a batch-wise or continuous process with a static or flowing gas atmosphere. After firing, a scintillator of the present invention may be further pulverized to produce the scintillator in the powder form which can be pressed into compacted scintillator elements for use in detectors of X-ray CT systems. The powder may be compacted by a method such as hot pressing or hot isostatic pressing into desired shaped bodies. Alternatively, the powder may be hot pressed or hot isostatically pressed into desired shaped bodies after the step of calcining but before the step of firing.

In another aspect of the present invention, the composition of the scintillator and the firing temperatures are chosen such that the final scintillator is substantially a solid solution. A solid solution is most preferred because the X-ray detecting element would have a substantially uniform composition, refractive index, and higher light output.

Alternatively, a scintillator that has a composition suitable for single crystal growth may be produced in single crystal form. In this process, a seed crystal of the desired composition is introduced into a saturated solution containing appropriate compounds and new crystalline material is allowed to grow and add to the seed crystal using any well-known crystal growth method.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A scintillator composition comprising hafnium oxide doped with titanium oxide and at least an oxide of at least a metal selected from the group consisting of Be, and Mg; wherein titanium oxide is present in an amount from about 0.05 to about 4 mole percent of said scintillator composition; said at least an oxide of at least a metal selected from the group consisting of Be, Mg is present in an amount from about 0.05 to about 4 mole percent; said scintillator being capable of emitting visible light in response to high-energy radiation selected from the group consisting of X, β, and γ radiation.

2. The scintillator composition according to claim 1; wherein said titanium oxide is in the range from about 0.05 to about 1.5 mole percent; and said at least an oxide of at least a metal selected from the group consisting of Be, and Mg is in a range from about 0.5 to about 3 mole percent.

3. The scintillator composition according to claim 1, further comprising an oxide of one of scandium and tin in an amount of up to about 5 mole percent.

4. The scintillator composition according to claim 1, further comprising at least a rare earth metal oxide in an amount up to about 500 parts per million.

5. The scintillator composition according to claim 4, wherein said at least a rare earth metal oxide is selected from the group consisting of lutetium oxide, europium oxide, and neodymium oxide.

6. The scintillator composition according to claim 1; wherein said titanium oxide is in the range from about 0.1 to about 1 mole percent.

7. The scintillator composition according to claim 1; wherein said titanium oxide is in the range from about 0.125 to about 0.75.

8. The scintillator composition according to claim 1; wherein said at least an oxide of at least a metal selected from the group consisting of Be, and Mg is in a range from about 1 to about 2 mole percent.

9. A scintillator composition comprising hafnium oxide doped with titanium oxide and magnesium oxide; wherein titanium oxide is present in an amount from about 0.05 to about 4 mole percent of said scintillator composition; said magnesium oxide is present in an amount from about 0.05 to about 4 mole percent; said scintillator being capable of emitting visible light in response to high-energy radiation selected from the group consisting of X, β, and γ radiation.

10. The scintillator composition according to claim 9; wherein said titanium oxide is in the range from about 0.05 to about 1.5 mole percent; and MgO is in a range from about 0.5 to about 3 mole percent.

11. The scintillator composition according to claim 9; wherein said magnesium oxide is present in an amount from about 1 to about 2 mole percent.

12. A scintillator composition comprising hafnium oxide doped with titanium oxide and at least an oxide of at least a metal selected from the group consisting of Be, Mg, and Li; wherein titanium oxide is present in an amount from about 0.05 to about 4 mole percent of said scintillator composition; said at least an oxide of at least a metal selected from the group consisting of Be, Mg, and Li is present in an amount from about 0.05 to about 4 mole percent; said scintillator being capable of emitting visible light in response to high-energy radiation selected from the group consisting of X, β, and γ radiation; said scintillator composition further comprising boron oxide in an amount up to about 500 parts per million.

13. A scintillator composition comprising hafnium oxide doped with:
    (a) titanium oxide;
    (b) at least an oxide of a metal selected from the group consisting of Be, and Mg;
    (c) at least an oxide selected from the group consisting of scandium oxide and tin oxide; and
    (d) at least an oxide of at least a rare earth metal;
wherein said titanium oxide is present in an amount from about 0.05 to about 4 mole percent; said at least an oxide of a metal selected from the group consisting of Be, and Mg is present in an amount from about 0.05 to about 4 mole percent; said at least an oxide selected from the group consisting of scandium oxide and tin oxide is present in an amount up to about 5 mole percent; and said at least an oxide of at least a rare earth metal is present up to about 500 parts per million; said scintillator being capable of emitting visible light in response to high-energy radiation selected from the group consisting of X, β, and γ radiation.

14. The scintillator composition according to claim 13, wherein said at least a rare earth metal is selected from the group consisting of lutetium, europium, and neodymium.

15. A method for producing a titanium-doped hafnium oxide scintillator composition that comprises at least one metal selected from the group consisting of Be, and Mg, said method comprising the steps of:
    (1) providing amounts of compounds of titanium, hafnium, and at least one metal selected from the group consisting of Be, and Mg;
    (2) mixing together said compounds to form a mixture; and
    (3) firing said mixture in an oxygen-containing atmosphere at a firing temperature for a time sufficient to convert said mixture to a titanium-doped hafnium oxide scintillator composition that comprises said at least one metal selected from the group consisting of Be, and Mg;
wherein said amounts of compounds are chosen to obtain the final desired composition of said scintillator, and said scintillator is capable of emitting visible light in response to an excitation of high-energy radiation selected from the group consisting of X, β, and γ radiation.

16. The method according to claim 15 further comprising the step of mixing at least one compound selected from the group consisting of halides and carbonates of titanium, hafnium, and said at least one metal selected from the group consisting of Be, and Mg in said mixture in a quantity sufficient to act as a flux during said firing.

17. The method according to claim 16, wherein said quantity of said at least one compound is less than about 20 percent by weight of a total weight of said mixture.

18. The method according to claim 15 further comprising mixing at least one compound of one of scandium and tin into said mixture.

19. The method according to claim 15 further comprising adding at least one compound of at least one rare earth metal into said mixture.

20. The method according to claim 15, wherein said firing temperature is in a range from about 900° C. to about 1650° C.

21. The method according to claim 17, wherein said firing temperature is from about 1300° C. to about 1400° C.

22. The method according to claim 18, wherein said oxygen-containing atmosphere comprises a gas selected from the group consisting of air, oxygen, $CO_2$, and mixtures thereof and an inert gas selected from the group consisting of nitrogen, helium, neon, argon, krypton, and xenon.

23. A method for producing a titanium-doped hafnium oxide scintillator composition that comprises at least one alkaline earth metal, said method comprising the steps of:
    (1) providing a first solution from amounts of compounds of titanium, hafnium, and at least one alkaline earth metal selected from the group consisting of Be and Mg;
    (2) providing a second solution selected from the group consisting of ammonium hydroxide; alkyl esters of a di-carboxylic acid selected from the group consisting of oxalic acid, malonic acid, succinic acid, and glutaric acid; amines selected from the group consisting of methanolamine, ethanolamine, propanolamine, dimethanolamine, diethanolamine, dipropanolamine, trimethanolamine, triethanolamine, and tripropanolamine; and mixtures thereof;

(3) mixing together said first solution and said second solution to form a precipitate mixture of oxygen-containing compounds of titanium, hafnium, and said at least one alkaline earth metal selected from the group consisting of Be and Mg;

(4) separating said precipitate mixture from a supernatant liquid; and (5) firing said precipitate mixture at a temperature and for a time sufficient to convert said dried precipitate mixture to said titanium-doped hafnium oxide scintillator composition that comprises said at least one alkaline earth metal;

wherein said amounts of compounds are chosen to obtain a final desired composition of said titanium-doped hafnium oxide scintillator that comprises said at least one metal selected from the, and said scintillator is capable of emitting visible light in response to an excitation of high-energy radiation selected from the group consisting of X, $\beta$, and $\gamma$ radiation.

24. The method according to claim 23, wherein said first solution further comprises an amount of at least a compound of one of scandium and tin.

25. The method according to claim 23, wherein said first solution further comprises an amount of at least a compound of at least one rare earth metal.

26. A method for producing a titanium-doped hafnium oxide scintillator composition that comprises at least one alkaline earth metal, said method comprising the steps of:

(1) providing a first solution from amounts of compounds of titanium, hafnium, and at least one metal selected from the group consisting of Be, Mg, and Li;

(2) providing a second solution selected from the group consisting of ammonium hydroxide; alkyl esters of a di-carboxylic acid selected from the group consisting of oxalic acid, malonic acid, succinic acid, and glutaric acid; amines selected from the group consisting of methanolamine, ethanolamine, propanolamine, dimethanolamine, diethanolamine, dipropanolamine, trimethanolamine, triethanolamine, and tripropanolamine; and mixtures thereof;

(3) mixing together said first solution and said second solution to form a precipitate mixture of oxygen-containing compounds of titanium, hafnium, and said at least one metal selected from the group consisting of Be, Mg, and Li;

(4) separating said precipitate mixture from a supernatant liquid; and (5) firing said precipitate mixture at a temperature and for a time sufficient to convert said dried precipitate mixture to said titanium-doped hafnium oxide scintillator composition that comprises said at least one alkaline earth metal;

wherein said amounts of compounds are chosen to obtain a final desired composition of said titanium-doped hafnium oxide scintillator that comprises said at least one metal selected from the, and said scintillator is capable of emitting visible light in response to an excitation of high-energy radiation selected from the group consisting of X, $\beta$, and $\gamma$ radiation, and wherein said method further comprises the step of adding at least one compound selected from the group consisting of halides and carbonates of titanium, hafnium, and at least one metal selected from the group consisting of Be, Mg, and Li in said first solution in a quantity sufficient to act as a flux during said firing.

27. The method according to claim 26, wherein said quantity of said compound is less than about 20 percent by weight of a total weight of said dried precipitate.

28. The method according to claim 26 further comprising the step of calcining said precipitate mixture in atmosphere containing oxygen at a temperature in a range from about 400° C. to about 900° C. before the firing step.

29. The method according to claim 28, wherein said firing is conducted at a firing temperature in a range from about 900° C. to about 1650° C.

30. The method according to claim 29, wherein said firing temperature is preferably in a range from about 1300° C. to about 1400° C.

31. A detector element of an X-ray CT scanner comprising a titanium-doped hafnium oxide scintillator composition, wherein said scintillator composition comprises hafnium oxide doped with titanium oxide and at least an oxide of at least a metal selected from the group consisting of Be, Mg, and Li; wherein titanium oxide is present in an amount from about 0.05 to about 4 mole percent of said scintillator composition; said at least an oxide of at least a metal selected from the group consisting of Be, Mg, and Li is present in an amount from about 0.05 to about 4 mole percent; said scintillator being capable of emitting visible light in response to high-energy radiation selected from the group consisting of X, $\beta$, and $\gamma$ radiation.

32. The detector element of an X-ray CT scanner according to claim 31, wherein said at least a metal is Mg.

33. The detector element of an X-ray CT scanner according to claim 31, wherein said titanium oxide is in the range from about 0.05 to about 1.5 mole percent, and said at least an oxide of at least a metal selected from the group consisting of Be, Mg, and Li is preferably in a range from about 0.5 to about 3 mole percent.

34. The detector element of an X-ray CT scanner according to claim 31, wherein said scintillator composition further comprises an oxide of one of scandium and tin in an amount of up to about 5 mole percent.

35. The detector element of an X-ray CT scanner according to claim 31, wherein said scintillator composition further comprises at least a rare earth metal oxide in an amount up to about 500 parts per million.

36. The detector element of an X-ray CT scanner according to claim 31, wherein said scintillator composition further comprises boron oxide in an amount up to about 500 parts per million.

37. A detector element of an X-ray CT scanner comprising a hafnium oxide scintillator composition, which is doped with:

(a) titanium oxide;

(b) at least an oxide of a metal selected from the group consisting of Be, Mg, and Li;

(c) at least an oxide selected from the group consisting of scandium oxide and tin oxide; and (d) at least an oxide of at least a rare earth metal;

wherein said titanium oxide is present in an amount from about 0.05 to about 4 mole percent; said at least an oxide of a metal selected from the group consisting of Be, Mg, and Li is present in an amount from about 0.05 to about 4 mole percent; said at least an oxide selected from the group consisting of scandium oxide and tin oxide is present in an amount up to about 5 mole percent; and said at least an oxide of at least a rare earth metal is present up to about 500 parts per million; said scintillator being capable of emitting visible light in response to high-energy radiation selected from the group consisting of X, β, and γ radiation.

38. The detector element of an X-ray CT scanner according to claim 37 wherein said at least a rare earth metal is selected from the group consisting of lutetium, europium, and neodymium.

39. An X-ray CT scanner comprising an X-ray detector that comprises a titanium-doped hafnium oxide scintillator composition, wherein said scintillator composition comprises hafnium oxide doped with titanium oxide and at least an oxide of at least a metal selected from the group consisting of Be, Mg, and Li; wherein titanium oxide is present in an amount from about 0.05 to about 4 mole percent of said scintillator composition; said at least an oxide of at least a metal selected from the group consisting of Be, Mg, and Li is present in an amount from about 0.05 to about 4 mole percent; said scintillator being capable of emitting visible light in response to high-energy radiation selected from the group consisting of X, β, and γ radiation.

40. The X-ray CT scanner according to claim 39, wherein said metal is Mg.

41. The X-ray CT scanner according to claim 39, wherein said titanium oxide is preferably in a range from about 0.005 to about 1.5 mole percent, and said at least an oxide of at least a metal selected from the group consisting of Be, Mg, and Li is in a range from about 0.5 to about 3 mole percent.

42. The X-ray CT scanner according to claim 39, wherein said scintillator composition further comprises an oxide of one of scandium and tin in an amount of up to about 5 mole percent.

43. The X-ray CT scanner according to claim 39, wherein said scintillator composition further comprises at least a rare earth metal oxide in an amount up to about 500 parts per million.

44. The X-ray CT scanner according to claim 39, wherein said scintillator composition further comprises boron oxide in an amount up to about 500 parts per million.

45. An X-ray CT scanner comprising an X-ray detector that comprises a hafnium oxide scintillator composition, which is doped with:

(a) titanium oxide;

(b) at least an oxide of a metal selected from the group consisting of Be, Mg, and Li;

(c) at least an oxide selected from the group consisting of scandium oxide and tin oxide; and (d) at least an oxide of at least a rare earth metal;

wherein said titanium oxide is present in an amount from about 0.05 to about 4 mole percent; said at least an oxide of a metal selected from the group consisting of Be, Mg, and Li is present in an amount from about 0.05 to about 4 mole percent; said at least an oxide selected from the group consisting of scandium oxide and tin oxide is present in an amount up to about 5 mole percent; and said at least an oxide of at least a rare earth metal is present up to about 500 parts per million; said scintillator being capable of emitting visible light in response to high-energy radiation selected from the group consisting of X, β, and γ radiation.

46. The X-ray CT scanner according to claim 45, wherein said at least a rare earth metal is selected from the group consisting of lutetium, europium, and neodymium.

* * * * *